United States Patent [19]
Dolphin

[11] 3,857,428
[45] Dec. 31, 1974

[54] INSTANT TIRE CHAINS

[76] Inventor: Joseph R. Dolphin, 313 S. Davies Rd., Lake Stevens, Wash. 98258

[22] Filed: May 30, 1973

[21] Appl. No.: 365,141

Related U.S. Application Data

[63] Continuation-in-part of Ser. No. 212,216, Feb. 29, 1972.

[52] U.S. Cl............. 152/241, 152/213 R, 152/243
[51] Int. Cl........................................... B60c 27/06
[58] Field of Search............ 152/213 R, 213 A, 241, 152/243; 81/15.8

[56] References Cited
UNITED STATES PATENTS

| | | | |
|---|---|---|---|
| 1,258,823 | 3/1918 | Smith | 152/213 A |
| 2,083,903 | 6/1937 | Fitzgerald | 152/213 A |
| 2,216,469 | 10/1940 | Fischer | 81/15.8 |
| 2,217,498 | 10/1940 | Shepherd et al. | 152/213 R |
| 2,311,621 | 2/1943 | Royer | 152/213 A |
| 2,553,849 | 5/1951 | Dines | 152/213 A |
| 2,582,493 | 1/1952 | Lloyd | 152/213 R |
| 2,622,651 | 12/1952 | Gause | 152/213 A |
| 3,228,446 | 1/1966 | Meys | 152/213 A |

Primary Examiner—Drayton E. Hoffman
Attorney, Agent, or Firm—Clarence A. O'Brien; Harvey B. Jacobson

[57] ABSTRACT

A pair of replacement hooks are provided for corresponding ends of the side chains of vehicle wheel skid chains together with an elongated handle comprising a coil spring whose adjacent convolutions are abutted together, one end of the coil spring being provided with a side chain end link engaging hook and the other end of the coil spring defining a handgrip portion. The replacement hooks together with the handle have been designed for utilization in conjunction with a conventional vehicle wheel skid chain and to enable the skid chain to be quickly mounted upon an associated vehicle wheel without the wheel being elevated from the ground or rolled along the latter.

6 Claims, 10 Drawing Figures

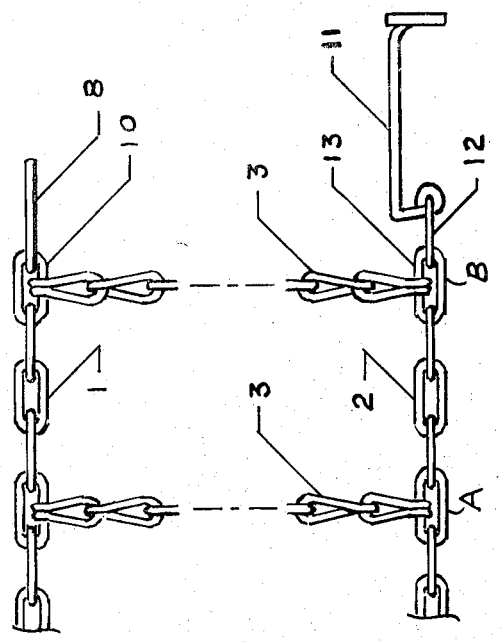
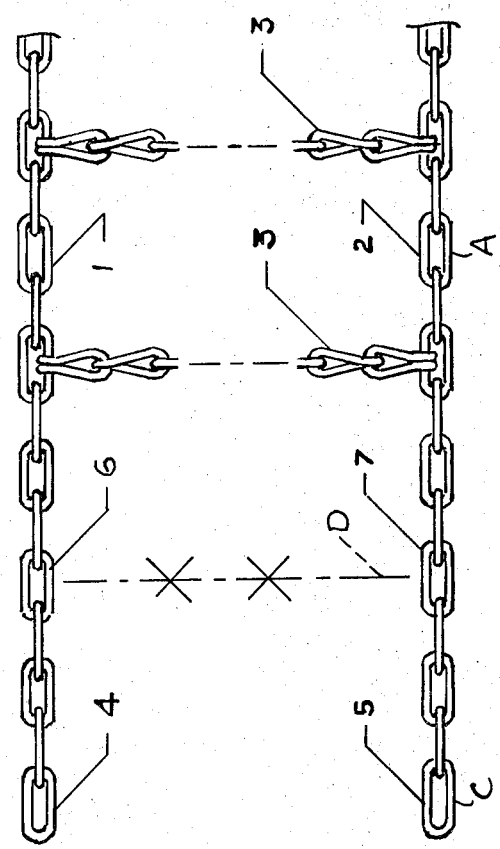
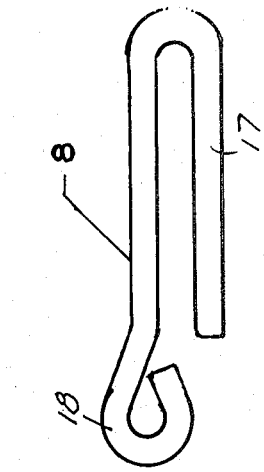
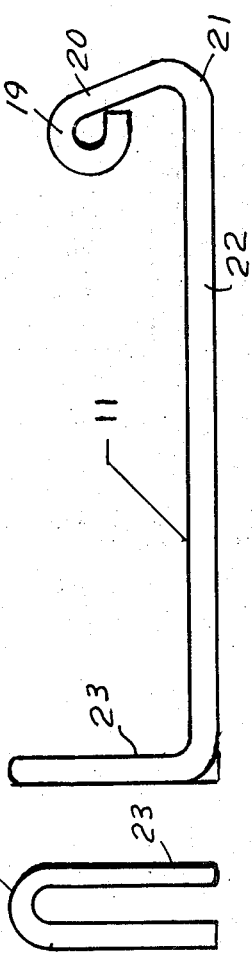
JOSEPH R. DOLPHIN
INVENTOR

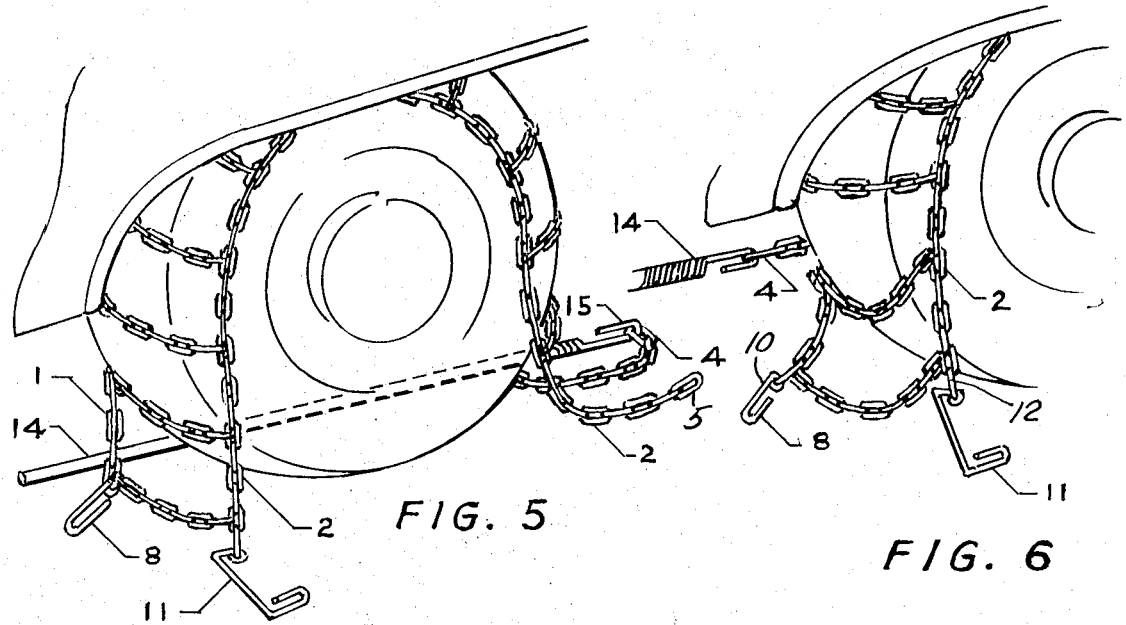
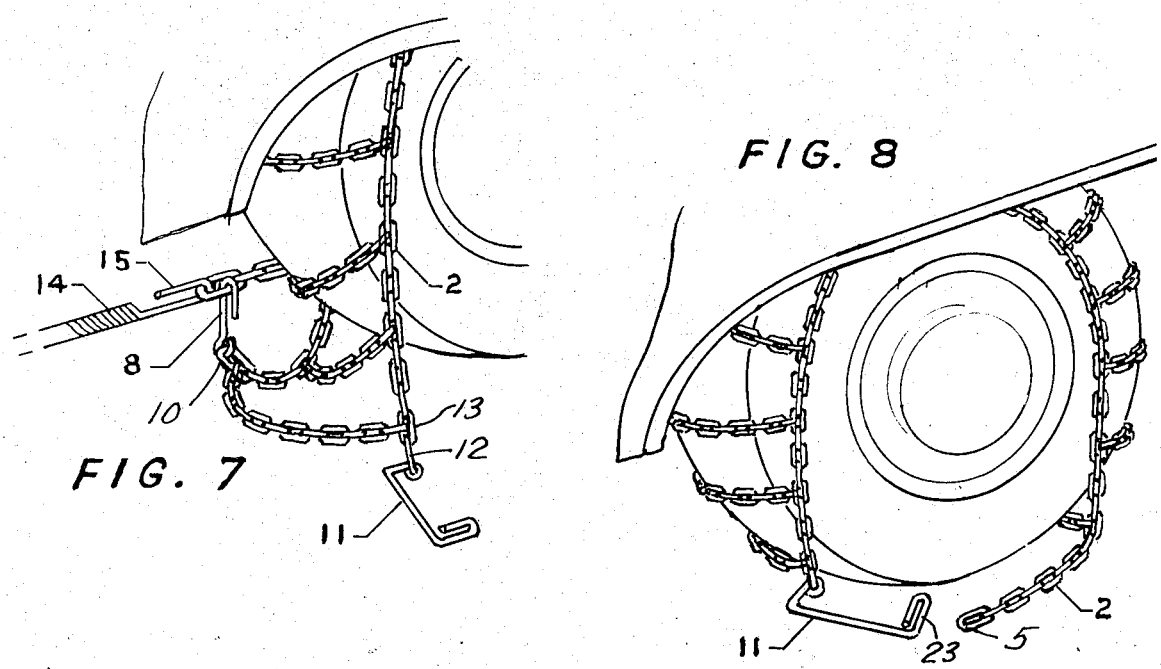
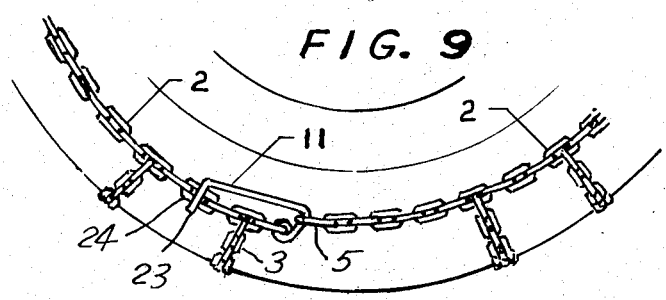
JOSEPH R. DOLPHIN
INVENTOR

INSTANT TIRE CHAINS

This is a continuation-in-part application of my copending application Ser. No. 212,216, filed Feb. 29, 1972, for "INSTANT" TIRE CHAINS.

There have in the past been developed various types of attachments and accessories for quickly applying a skid chain to a vehicle wheel. However, most of these accessories and/or attachments have required that the vehicle wheel be elevated above the ground or rolled along the latter during some phase of mounting a skid chain on the wheel. Further, while some tire chain fastening devices may be utilized to fasten a skid chain about a vehicle wheel without jacking the wheel above the ground or rolling the wheel along the ground, these previously known devices have been at best difficult to operate and to release when ice-coated if it is desired to remove the associated skid chains.

It is accordingly the main object of this invention to provide a skid chain assembly or attachments for a conventional skid chain which will greatly simplify the procedure of securing a skid chain about a vehicle wheel and enable the skid chain to be applied to the wheel without jacking the wheel above the ground or rolling the wheel along the ground.

Another object of this invention in accordance with the immediately preceding object, is to provide a skid chain assembly which may be readily mounted on an associated vehicle wheel by persons having no more than minimum mechanical ability.

A final object of this invention to be specifically enumerated herein is to provide a skid chain assembly in accordance with the preceding objects which will conform to conventional forms of manufacture, be of simple construction and easy to use so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a plan view of a vehicle wheel skid chain constructed in accordance with the present invention, the central portion of the skid chain intermediate its opposite end portions being broken away;

FIG. 2 is a side elevational view of a deep throated hook to be used on the end link of one of the side chains of the skid chain at the open end of the skid chain;

FIG. 3 is a plan view of a handle member having a deep throated hook on one end thereof and which is utilized in applying the skid chain of FIG. 1 to a vehicle wheel;

FIG. 4 is a side elevational view of a cinching hook to be used on the free end of the other side chain at the open end of the skid chain assembly;

FIG. 4a is an end elevational view of the cinching hook of FIG. 4 as seen from the left side thereof;

FIG. 5 is a perspective view illustrating the manner in which the skid chain is initially draped over a vehicle wheel and the hooked handle is engaged with one end of the inner side chain of the skid chain;

FIG. 6 is a fragmentary perspective view similar to FIG. 5 and illustrating the manner in which the handle is utilized to pull the side chain end with which the handle is engaged toward the front of the vehicle wheel along the inside thereof;

FIG. 7 is a fragmentary perspective view illustrating the manner in which the opposite ends of the inner side chain of the skid chain are hooked together;

FIG. 8 is a fragmentary perspective view similar to FIG. 5 and illustrating the skid chain as applied to the vehicle wheel just prior to engagement of the cinching hook of the outer side chain with the opposite end of the outer side chain; and FIG. 9 is a fragmentary side elevational view illustrating the lower portion of the skid chain as fully applied to the associated vehicle wheel.

Referring now more specifically to the drawings and to FIGS. 1, 2, 3, 4 and 4a in particular, a conventional vehicle wheel skid chain is designated at A and includes closed and open ends B and C, respectively. The skid chain A includes opposite side chains 1 and 2 and a plurality of cross chains 3.

Conventionally, the skid chain A has one pair of corresponding ends of the side chains 1 and 2 thereof provided with hook assemblies such as that disclosed in U.S. Pat. No. 2,707,411 and designated by the reference numeral (28). However, the skid chain A, if comprising a conventional skid chain to be modified in accordance with the present invention, has such closeable and openable hook assemblies removed. Instead, the end links 10 and 13 of the closed end B of the skid chain A have hooks 8 and 11 secured thereto, the hook 11 being secured to the end link 13 by means of a connecting link 12. Also, at the open end of the skid chain A, the first cross chain D is removed from between the side chain links 6 and 7 in order that the side chains 1 and 2 at the open end C of the skid chain A will have approximately eight chain links each defining approximately twice the normal spacing between adjacent cross chains 3. The side chains 1 and 2 terminate at the open end C of the skid chain A at links 4 and 5, respectively.

With attention now invited more specifically to FIG. 3, there may be seen an elongated handle designated by the letter E and which comprises an elongated coil spring 14 with adjacent convolutions thereof disposed in tightly abutted relation. One end of the coil spring includes an elongated deep throated hook 15 and the other end of the coil spring defines a handgrip portion 16.

It may be seen from FIG. 2 of the drawings that the deep throated hook 8 includes a hook 17 which is similar to the deep throated hook 15 and a base end portion defining an attaching eye 18. Also, from FIGS. 4 and 4a of the drawings, it may be seen that the cinching hook 11 includes an attaching eye 19 on one end having an integral tangent short arm portion 20 which extends outwardly from the eye 19 a short distance and then is sharply curved as at 21 to define an elongated arm portion 22 terminating at its free end in a U-shaped hook 23 disposed in a plane normal to the elongated arm portion 22 and opening to the side of the arm portion 22 opposite to the side thereof on which the short arm portion 20 is disposed.

With attention now invited more specifically to the second sheet of drawings upon which FIGS. 5 through 9 appear, when installing the skid chain A the latter is initially draped over the associated vehicle wheel in the manner illustrated in FIG. 5 and with the open end of the chain lying on the ground. Then, the handle E is held by the handgrip end 16 and placed behind the wheel as illustrated in FIG. 5 with the deep throated hook 15 adjacent the end link 4 of the side chain 1. Subsequently, the link 4 is engaged with the hook 15 and the handle E is pulled from the handgrip end in order to pull the free end of the side chain 1 at the open end of the skid chain A over the ground on the inside of the tire to the position thereof illustrated in FIG. 6.

Thereafter, the deep throated hook 8 is engaged with the end link 4 and the spring 14 is disengaged from the hook 15, the intermediate step of engaging the hook 8 with the end link 4 being illustrated in FIG. 7. Thereafter, the handle E is removed and the open end of the chain A is repositioned over the rear side of the tire illustrated in FIG. 8 and the end of the side chain 2 at the open end of the skid chain A and the cinching hook 11 are brought toward each other as illustrated in FIG. 8. Thereafter, the U-shaped hook 23 of the cinching hook 11 has its closed end inserted through the link 5 and the cinching hook 11 is thereafter swung, at its free end, upwardly so that the link 5 will slide along the elongated arm portion 22 toward the sharply curved portion 21. The free end of the cinching hook 11 is then swung downwardly past the side chain 2 on the opposite side of the adjacent cross chain 3 and engaged with the link 24 of the side chain 2, see FIG. 9.

All of the above-mentioned steps may be readily carried out by even unexperienced persons when an appreciable amount of snow is on the ground and in a minimum of time. Further, the cinching hook 11 is of a size to accommodate one or more links of the side chain 2 adjacent the link 5 and the hook 8 is deep throated to accommodate one or more links of the side chain 1, whereby the chain A may be made reduced in size to tightly fit the wheel upon which it is mounted. Thus, conventional skid chain tighteners need not be used with the skid chain A.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An elongated skid chain construction comprising a pair of spaced opposite side link chains and a plurality of cross link chains extending between and secured to pairs of corresponding links of said side chains at points spaced generally equally along said side chains, the spacing between corresponding end links of said side chains at one end of said skid chain construction and the adjacent cross link chain being at least generally equal to twice the spacing between pairs of adjacent cross link chains, an elongated hook member having a deep throated hook portion on one opening toward the other end of the hook member and an attaching eye on its other end engaged with one end link of one of said side link chains, said deep throated hook portion being removably engaged with the end link at the other end of said one side link chain, and an elongated cinching hook including an elongated arm portion terminating at one end in an outwardly directed and slightly back-turned short arm portion terminating at its end remote from said elongated arm portion in an attaching eye engaged with one end link of the other side link chain, the other end of said elongated arm portion terminating in a U-shaped member disposed generally normal to said elongated arm member and opening toward the side of said elongated arm member opposite the side thereof from which said short arm portion projects, said U-shaped member being removably engaged with said other side link chain spaced from said one end link thereof.

2. The combination of claim 1 wherein said one end link of the other side link chain comprises the end link thereof corresponding to said one end link of said one side link chain.

3. The combination of claim 1 including a vehicle tire about which said skid chain assembly is disposed, said spacing being at least equal to the length of ground contact area of said tire when normally inflated.

4. The combination of claim 3 including an elongated handle having deep throated reversely turned hook means on one end releasably engageable with one end link and handgrip means on the other end.

5. The combination of claim 4 wherein said elongated handle comprises an elongated coil spring member with adjacent convolutions thereof biased into tight contact with each other.

6. A cinching hook for one side link chain of a skid chain assembly, said cinching hook comprising an elongated arm portion terminating at one end in an integral sharply outwardly directed substantially straight short arm portion forming an included angle of slightly less than 90 degrees with said elongated arm portion and terminating at its end remote from said elongated arm portion in a smoothly inwardly curving integral attaching eye adapted to be engaged with one end link of said side link chain, the other end of said elongated arm portion terminating in a U-shaped member disposed generally normal to said elongated arm member opposite the side thereof from which said short arm portion projects, said U-shaped member being removably insertable through an end link at the other end portion of said side link chain and engageable with the end portion of said side chain adjacent said one end link.

* * * * *